United States Patent
Zagaynov et al.

(10) Patent No.: US 11,380,117 B1
(45) Date of Patent: Jul. 5, 2022

(54) ZERO-FOOTPRINT IMAGE CAPTURE BY MOBILE DEVICE

(71) Applicant: ABBYY Development Inc., Dover, DE (US)

(72) Inventors: Ivan Zagaynov, Dolgoprudniy (RU); Stepan Lobastov, Kirov (RU); Juri Katkov, Moscow (RU); Vasily Shahov, Dolgoprudniy (RU); Olga Titova, Kaliningrad (RU); Ivan Khintsitskiy, Moscow (RU)

(73) Assignee: ABBYY Development Inc., Moscow (RU)

( * ) Notice: Subject to any disclaimer, the term of this patent is extended or adjusted under 35 U.S.C. 154(b) by 0 days.

(21) Appl. No.: 17/136,148

(22) Filed: Dec. 29, 2020

(30) Foreign Application Priority Data

Dec. 23, 2020 (RU) .......................... RU2020142701

(51) Int. Cl.
*G06K 9/00* (2022.01)
*G06V 30/414* (2022.01)
(Continued)

(52) U.S. Cl.
CPC ......... *G06V 30/414* (2022.01); *G06K 9/6217* (2013.01); *G06T 7/0002* (2013.01);
(Continued)

(58) Field of Classification Search
CPC ...... G06V 30/414; G06V 10/40; G06V 20/46; G06V 30/10; G06K 9/6217; G06T 7/0002;
(Continued)

(56) References Cited

U.S. PATENT DOCUMENTS

| 8,271,618 | B1* | 9/2012 | Kridlo | H04L 67/42 709/219 |
| 9,406,110 | B2* | 8/2016 | Lin | G06T 7/00 |

(Continued)

FOREIGN PATENT DOCUMENTS

| KR | 101709085 B1 * | 2/2017 | ............. G06F 17/30 |
| KR | 101709085 B1 | 2/2017 | |

(Continued)

OTHER PUBLICATIONS

Niftyview: a zero-footprint web application for viewing DICOM and NIfTI files, Weiran Deng, GigaScience, 2016, pp. 1-2 (Year: 2016).*

(Continued)

*Primary Examiner* — Jayesh A Patel
(74) *Attorney, Agent, or Firm* — Lowenstein Sandler LLP

(57) ABSTRACT

A computer-implemented method for image capture by a mobile device, comprising: receiving, by a video capturing application running on a mobile device, a video stream from a camera of the mobile device; identifying a specific frame of the video stream; generating a plurality of hypotheses defining image borders within the specific frame; selecting, by a neural network, a particular hypothesis among the plurality of hypotheses; producing a candidate image by applying the particular hypothesis to the specific frame; determining a value of a quality metric of the candidate image; determining that the value of the quality metric of the candidate image exceeds one or more values of the quality metric of one or more previously processed images extracted from the video stream; wherein the image capture application is a zero-footprint application.

20 Claims, 6 Drawing Sheets

(51) Int. Cl.
*G06T 7/00* (2017.01)
*G06T 7/11* (2017.01)
*G06K 9/62* (2022.01)
*G06V 10/40* (2022.01)
*G06V 20/40* (2022.01)
*G06V 30/10* (2022.01)

(52) U.S. Cl.
CPC ............... *G06T 7/11* (2017.01); *G06V 10/40* (2022.01); *G06V 20/46* (2022.01); *G06T 2200/24* (2013.01); *G06T 2207/10016* (2013.01); *G06T 2207/20084* (2013.01); *G06T 2207/20132* (2013.01); *G06T 2207/30168* (2013.01); *G06T 2207/30176* (2013.01); *G06V 30/10* (2022.01)

(58) Field of Classification Search
CPC .................. G06T 7/11; G06T 2200/24; G06T 2207/10016; G06T 2207/20084; G06T 2207/20132; G06T 2207/30168; G06T 2207/30176
See application file for complete search history.

(56) References Cited

U.S. PATENT DOCUMENTS

| | | | | |
|---|---|---|---|---|
| 9,514,389 B1* | 12/2016 | Erhan | .................. | G06V 30/194 |
| 10,484,505 B2* | 11/2019 | Kridlo | .................... | H04L 67/34 |
| 10,789,569 B1* | 9/2020 | Anor | .................... | G07G 1/0036 |
| 2002/0047047 A1* | 4/2002 | Poloniewicz | ...... | G06K 7/10722 |
| | | | | 235/454 |
| 2013/0182002 A1* | 7/2013 | Macciola | ............... | G06V 10/25 |
| | | | | 345/589 |
| 2014/0143298 A1* | 5/2014 | Klotzer | ................... | H04L 67/42 |
| | | | | 709/203 |
| 2014/0376060 A1* | 12/2014 | Bocharov | .......... | H04N 1/00771 |
| | | | | 358/474 |
| 2016/0125613 A1* | 5/2016 | Shustorovich | ....... | G06V 30/414 |
| | | | | 382/140 |
| 2017/0091385 A1* | 3/2017 | Knoplioch | .............. | G16H 30/20 |
| 2017/0177932 A1* | 6/2017 | Copsey | ................ | G06V 30/142 |
| 2019/0089856 A1* | 3/2019 | Yellapragada | .......... | G06V 20/63 |
| 2020/0013371 A1* | 1/2020 | Yang | ........................ | G09G 5/00 |

FOREIGN PATENT DOCUMENTS

| | | | | |
|---|---|---|---|---|
| RU | 2541353 C2 * | 2/2015 | ......... | H04N 1/00466 |
| RU | 2541353 C2 | 2/2015 | | |
| WO | 2013181637 A2 | 12/2013 | | |
| WO | WO-2013181637 A2 * | 12/2013 | ............... | G06N 3/04 |

OTHER PUBLICATIONS

Cloud computing in medical imaging, George C. Kagadis, Med Physics, 0094-2405, 2013, pp. 070901-1-070901-11 (Year: 2013).*
Methods for Objective and Subjective Evaluation of Zero-Client Computing, Fatma Alali et al., IEEEAccess, Jun. 26, 2019, pp. 94569-94581 (Year: 2019).*
Client/server approach to image capturing, Chris Tujin et al., SPIE, 1998, pp. 89-95 (Year: 1998).*

* cited by examiner

_US 11,380,117 B1_

ZERO-FOOTPRINT IMAGE CAPTURE BY MOBILE DEVICE

RELATED APPLICATIONS

This application claims priority under 35 USC 119 to Russian patent application No. RU2020142701, filed Dec. 23, 2020.

TECHNICAL FIELD

The implementations of the disclosure relate generally to image processing and, more specifically, to systems and methods for image capture by a mobile device.

BACKGROUND

Currently mobile devices can be used for document capture. However, various methods for mobile document capture involve user actions, such as manual adjustment of lighting, stabilizing mobile device, etc. The present invention describes automated mobile image capture.

SUMMARY OF THE DISCLOSURE

Implementations of the present disclosure describe mechanisms for image capture by a mobile device, comprising: receiving, by a video capturing application running on a mobile device, a video stream from a camera of the mobile device; identifying a specific frame of the video stream; generating a plurality of hypotheses defining image borders within the specific frame; selecting, by a neural network, a particular hypothesis among the plurality of hypotheses; producing a candidate image by applying the particular hypothesis to the specific frame; determining a value of a quality metric of the candidate image; determining that the value of the quality metric of the candidate image exceeds one or more values of the quality metric of one or more previously processed images extracted from the video stream; wherein the image capture application is a zero-footprint application.

In some implementations the method further comprises performing optical character recognition of a document depicted by the candidate image wherein the optical character recognition of the document is performed on the mobile device; cropping the candidate image; displaying the candidate image on a screen of the mobile device; wherein receiving the video stream is performed responsive to receiving a command via a web browser control; wherein receiving the video stream is performed responsive to receiving a command via a user interface control of the mobile device.

A non-transitory machine-readable storage medium of the disclosure includes instructions that, when accessed by a processing device, cause the processing device to: receive, by a video capturing application running on a mobile device, a video stream from a camera of the mobile device; identify a specific frame of the video stream; generate a plurality of hypotheses defining image borders within the specific frame; select, by a neural network, a particular hypothesis among the plurality of hypotheses; produce a candidate image by applying the particular hypothesis to the specific frame; determine a value of a quality metric of the candidate image; determine that the value of the quality metric of the candidate image exceeds one or more values of the quality metric of one or more previously processed images extracted from the video stream; wherein the image capture application is a zero-footprint application.

In some implementations the non-transitory machine-readable storage medium instructions further cause the processing device to perform optical character recognition of a document depicted by the candidate image wherein the optical character recognition of the document is performed on the mobile device; crop the candidate image; display the candidate image on a screen of the mobile device; wherein receiving the video stream is performed responsive to receiving a command via a web browser control; wherein receiving the video stream is performed responsive to receiving a command via a user interface control of the mobile device.

A system of the disclosure includes a memory, and a processing device operatively coupled to the memory, the processing device to receive, by a video capturing application running on a mobile device, a video stream from a camera of the mobile device; identify a specific frame of the video stream; generate a plurality of hypotheses defining image borders within the specific frame; select, by a neural network, a particular hypothesis among the plurality of hypotheses; produce a candidate image by applying the particular hypothesis to the specific frame; determine a value of a quality metric of the candidate image; determine that the value of the quality metric of the candidate image exceeds one or more values of the quality metric of one or more previously processed images extracted from the video stream; wherein the image capture application is a zero-footprint application.

In some implementations the system further to perform optical character recognition of a document depicted by the candidate image wherein the optical character recognition of the document is performed on the mobile device; crop the candidate image; display the candidate image on a screen of the mobile device; wherein receiving the video stream is performed responsive to receiving a command via a web browser control; wherein receiving the video stream is performed responsive to receiving a command via a user interface control of the mobile device.

BRIEF DESCRIPTION OF THE DRAWINGS

The disclosure will be understood more fully from the detailed description given below and from the accompanying drawings of various implementations of the disclosure. The drawings, however, should not be taken to limit the disclosure to the specific implementations, but are for explanation and understanding only.

DETAILED DESCRIPTION

Figure 1:
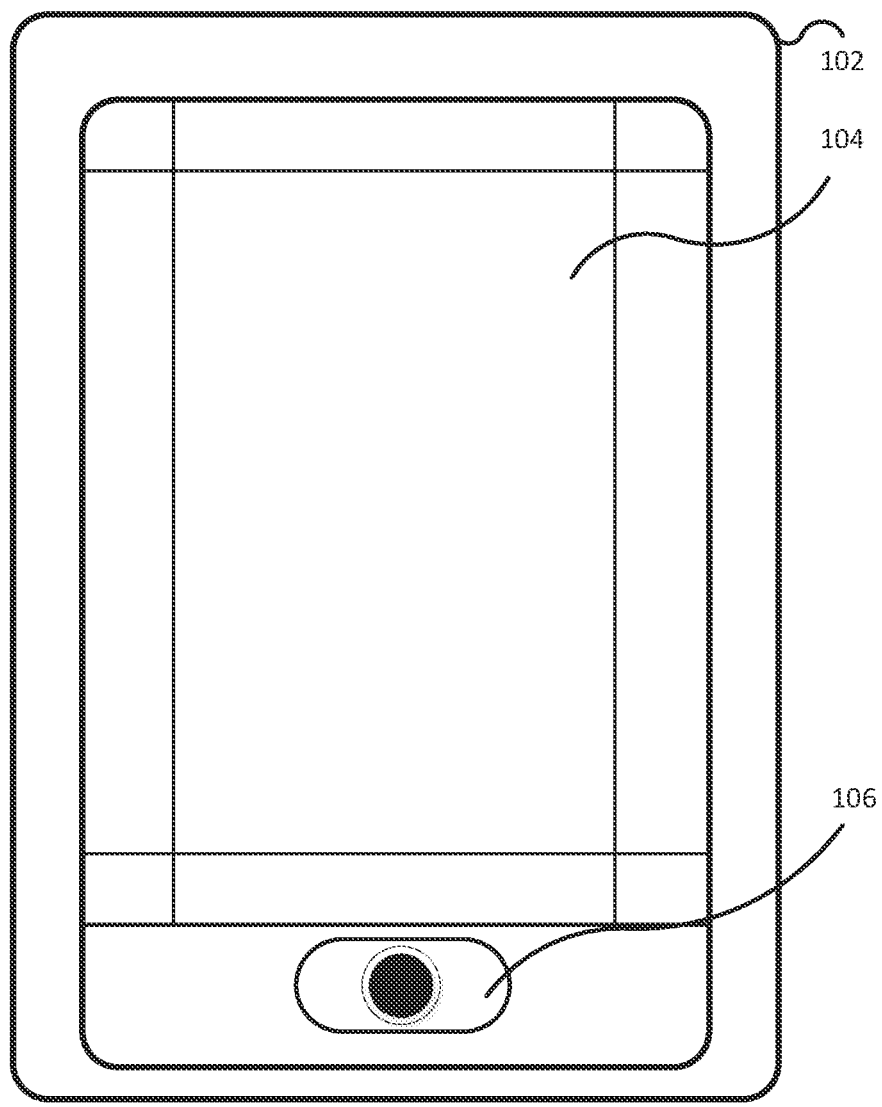
FIG. 1 is a schematic illustration of a mobile device in accordance with one or more aspects of the present disclosure.

Systems and methods for mobile image capture are described. Various methods of image capture by a mobile device involve significant user actions, such as manual adjustment of lighting, waiting for the mobile device to be stabilized to avoid blur and glare in the image being captured. Careful positioning of the mobile device with respect to the image being captured also may be critical for successful image capture. All parts of the image must be visible to the camera of the mobile device. The mobile device should be located close to the center of the image and preferably parallel to the surface of the image in order to avoid significant distortions. Often the user has to take a number of pictures to be able to choose the most suitable frame with minimal number of problems.

Most of the time, in order to capture an image by a mobile device, the user is required to install a specialized image acquiring application on the mobile device. However, the captured images are often of low quality. Also, many users do not wish to install another application on their devices.

Aspects of the disclosure address the above noted and other deficiencies by providing mechanisms for automatic image capture. According to the present invention, image capture is performed by analyzing multiple frames in of video stream captured by a camera and selecting a frame that is suitable for image processing in accordance with a set of user-configurable or automatically determined requirements.

One of the aspects of the present invention is automation of image capture. As used in this disclosure, image capture is automated when a sequence of video frames being captured by the camera are analyzed in real time without recording the video stream. If the analysis indicates that a video frame is of acceptable quality, such a video frame is automatically recorded. Subsequently the recorded image may be cropped and additionally processed to eliminate distortions and other deficiencies.

Another aspect of the present invention is that all interactions with the mobile device's camera, as well as the analysis of the video stream, identification of the suitable video frame, and transfer of the captured image to another device are performed by a zero-footprint application. A zero-footprint application is an application that is not installed on a mobile device ahead of time, but instead is downloaded by the mobile device only in response to a user's action in a browser window; upon termination, the application is then automatically deleted from the mobile device. For instance, such an application may be downloaded by the mobile device when a user activates a particular graphical user interface (GUI) control within a browser page. After the image capture is completed, this zero-footprint application is deleted from the mobile device.

As used herein, "frame" may refer to an image captured by a camera of a mobile device camera in real time, irrespective of whether or not the captured video stream, which includes a sequence of frames, is being recorded in real time or asynchronously with respect to capturing.

As used herein, "mobile device" may refer to a handheld computer, such as a mobile phone, a smartphone, a phablet, a tablet computer, a netbook, a digital media player, a handheld game console, a smart watch, a personal digital assistant device, an enterprise digital assistant device, a laptop, a digital camcorder, a digital still camera, a digital video camera. Some mobile devices may have a touch screen, providing a touchscreen interface with digital buttons and digital keyboard. Some mobile devices may have physical buttons along with a physical keyboard. Some mobile devices may be able to connect to transfer digital data via one or more input/output (I/O) interfaces (e.g., one or more network wireless and/or wired network interfaces, which may be utilized for establishing communication sessions with one or more servers and/or peer devices, via one or more networks comprising local and/or wide area networks, such as the Internet).

The techniques described herein allow for automatic image capture using artificial intelligence. The techniques may involve training a neural network to identify a suitable image border within a video frame. The neural network may include multiple neurons that are associated with learnable weights and biases. The neurons may be arranged in layers. The neural network may be trained on a training dataset of images with correctly identified image borders. For example, the training data set may include examples of images and suitable borders for these images, as training outputs.

The neural network may generate an observed output for each training input. The observed output of the neural network may be compared with a target output corresponding to the training input as specified by the training data set, and the error may be propagated back to the previous layers of the neural network, whose parameters (e.g., the weights and biases of the neurons) may be adjusted accordingly. During training of the neural network, the parameters of the neural network may be adjusted to optimize the prediction accuracy. Once trained, the neural network may be used for automatic image capture.

FIG. 1 represents an exemplary mobile device 102, having a display screen 104 and a camera control 106 to start video streaming and video recording by a camera of the mobile device 102. In some implementations of the present invention, the camera control 106 may be a virtual button, realized on a touch screen of the mobile device 102. In other implementations, the camera control 106 may be a physical push button. The display screen 104 may reproduce images (e.g., video frames) that are being captured by mobile device's camera.

Figure 2:
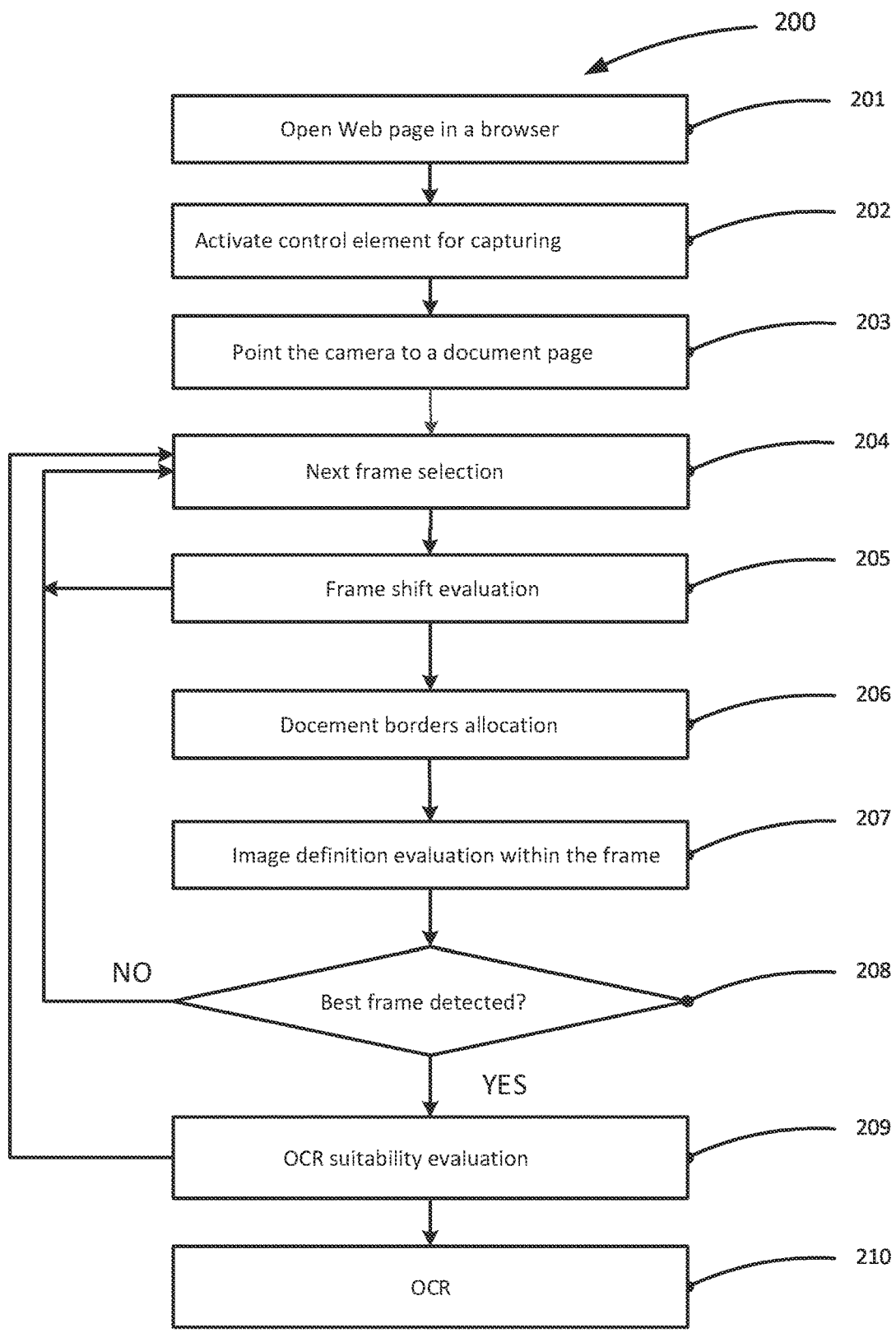
FIG. 2 is a flow diagram illustrating one exemplary method of image capture, in accordance with some implementations of the present disclosure.

FIG. 2 is a flow diagram illustrating exemplary method 200 of image capture, in accordance with some implementations of the present disclosure. Method 200 may be performed by processing logic that may comprise hardware (e.g., circuitry, dedicated logic, programmable logic, microcode, etc.), software (such as instructions run on a processing device), firmware, or a combination thereof. In one implementation, method 200 may be performed by a processing device (e.g. a processing device 602 of FIG. 6) of a computing device 510 and/or a server machine 550 as described in connection with FIG. 5. In certain implementations, method 200 may be performed by a single processing thread. Alternatively, method 200 may be performed by two or more processing threads, each thread executing one or more individual functions, routines, subroutines, or operations of the method. In an illustrative example, the processing threads implementing method 200 may be synchronized (e.g., using semaphores, critical sections, and/or other thread synchronization mechanisms). Alternatively, the processing threads implementing method 200 may be executed asynchronously with respect to each other. Therefore, while FIG. 2 and the associated descriptions list the operations of method 200 in certain order, various implementations of the methods may perform at least some of the described operations in parallel and/or in arbitrary selected orders.

At block 201, a user of the mobile device 102 opens a web page in a browser on the mobile device. The web page contains a control element (e.g., a visual control or a voice-activated control), which enables the user to start an application having camera control capabilities. In accordance with the present invention, this application is a zero-footprint application. Accordingly, when the web page is eventually closed by the user or is otherwise terminated, the application is automatically deleted from the mobile device 102.

At block 202, the user activates the control element on the web page. In response to the activation of the control element, the camera of the mobile device 102 is activated 203 by the zero-footprint application. The user points the lens of the mobile device's camera at the object to be captured and, as a sequence of video frames is being captured by the camera, the zero-footprint application analyzes the video stream. In some implementations, when the camera of the mobile device 102 is active, the zero-footprint application automatically begins analysis of the video stream when an image of a document appears in the camera's lens.

At block 204, the system of the present invention identifies a specific frame of the video stream (e.g., the last captured frame as of the current time). In some implementations of the present invention, the system converts the identified frame into HTML video and displays it to the user in real time using display screen 104.

In some implementations of the present invention, the acquired video frames are analyzed in real time, without previous recording of the video stream or the frame. Accordingly, the processed video frames may be discarded (e.g., by using a ring buffer in the memory of the mobile computing device for storing the acquired video frames, such that (N+1)-th frame overrides the previously recorded first frame, assuming that the buffer capacity allows storing of N frames, where N is a predefined integer value.

In other implementations of the present invention, the video stream is being recorded, i.e., stored in a volatile and/or non-volatile memory, and may later be processed asynchronously with respect to the recording. The recorded video stream can be retrieved from a local memory of the mobile computing device or from a remote server or a peer mobile computing device via a wired or wireless network connection.

After the specific frame is identified (204), the analysis of the frame begins. The frame is analyzed to determine quality of a document image contained in the frame and to identify the document image borders.

"Image borders" are contours delineating edges of the area in the frame to be further processed by the application (e.g., by performing optical character recognition of the text contained in the depicted document). If the image is a document page, image borders form a rectangle. Image borders are formed by "basic lines". In case of a rectangular image, the number of basic lines is four.

At block 205, the specific frame is analyzed by a shift detector. If the shift of the specific frame is above a predetermined threshold, the specific frame is disqualified, and another frame is identified as in block 204.

Figure 3:
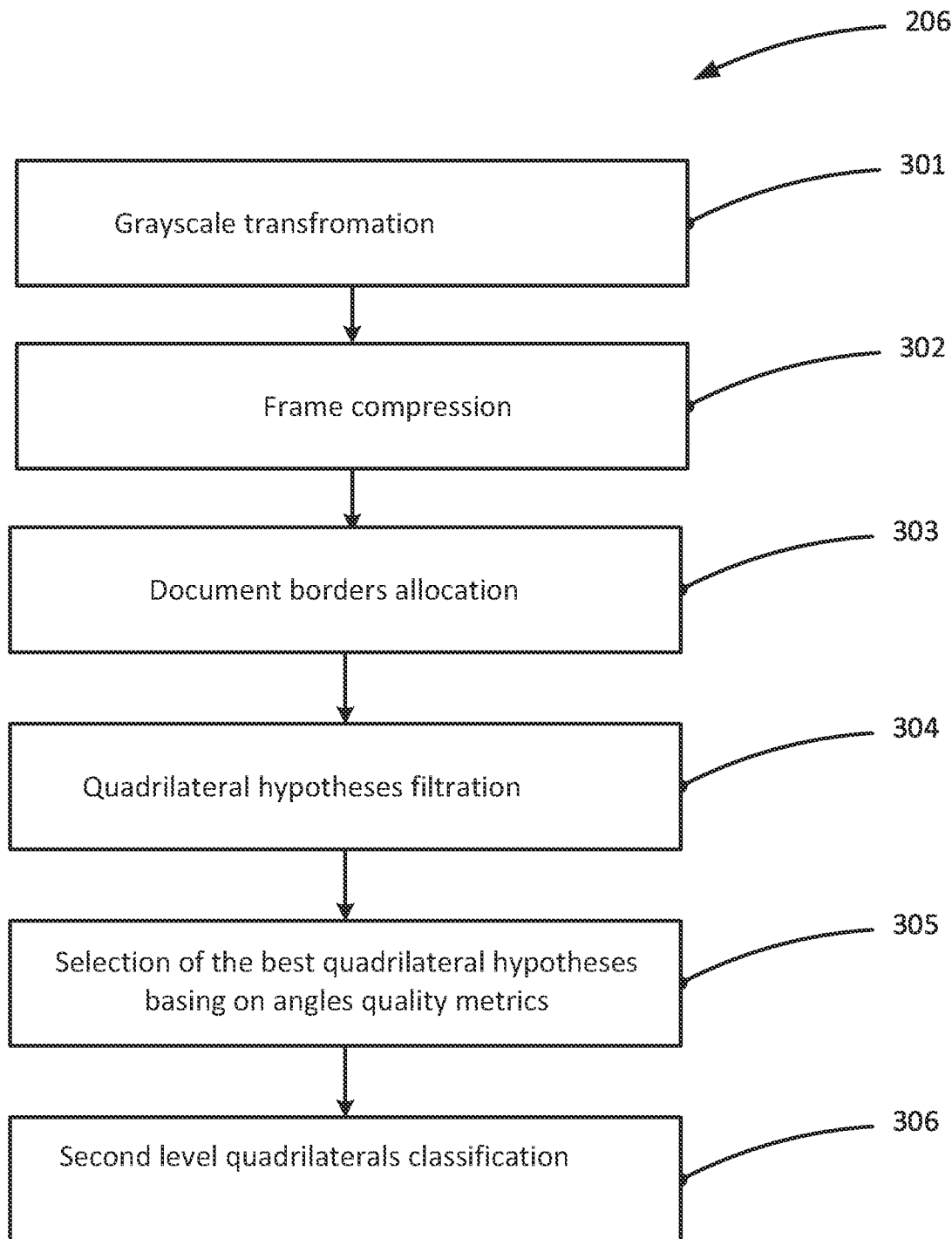
FIG. 3 is a flow diagram illustrating one exemplary method of identifying image borders, in accordance with some implementations of the present disclosure.

At block 206, the specific frame is analyzed to identify the image borders within the frame. Specific steps of the border identification process 206 are described in more detail below with reference to FIG. 3.

In order to identify borders of an image in a frame the system converts the frame to grayscale (301).

Color images are often stored as three separate image matrices: one storing the amount of red (R) in each pixel, one the amount of green (G) and one the amount of blue (B), so called RGB format. When converting an RGB image to grayscale, the RGB values for each pixel are transformed into a single value reflecting the brightness of that pixel. In some implementations, this transformation takes the average of the contribution from each channel: (R+G+B)/3. However, since the perceived brightness is often dominated by the green component, a different, more "human-oriented" implementation, is to take a weighted average, e.g.: 0.3R+0.59G+0.11B or other weighted average.

At block 302, the system of the present invention compresses the grayscale selected frame. In some implementations, the compression may be performed using bilinear interpolation. The compression is performed to the level when small insignificant details (such as scratches, noise, smudges) are erased, but substantial details of the image are still clearly visible. In some implementations, the frame is compressed to a predefined size, for example 1-3 Megapixels. In some implementation, the frame is compressed to the size of 256×256 px, i.e. 0.07 megapixels.

In some implementations, the frame is compressed to the size of a square having its side as a power of 2. Such compressions are particularly convenient if Hough transform is used in further processing of the specific frame. Compressing the selected frame significantly reduces time required to analyze the frame and, as a result, allows real time image capture from a video stream.

In some implementations of the present invention, other preprocessing operations may be applied to the specific frame, such as a median filter 3×3 or a Canny edge detector.

At block 303, the system of the present invention detects image borders within the specific frame. In some implementations, fast Hough transform is used to detect border lines. In some implementations, the fast Hough transform is applied to the specific frame at least twice to detect horizontal and vertical lines. The resulting image is scanned to detect local maximums. Each detected maximum identifies a potential image border.

In some implementations of the present invention, the system classifies detected maximums to identify maximums corresponding to image borders. This classification is performed by a linear classifier which determines confidence level for each detected maximum to correspond to an image border. The maximums with confidence levels above a predetermined threshold are identified and their corresponding lines are sorted into groups by a potential image border. For example, in case of a rectangle, the identified lines are sorted into four groups: top border group, bottom border group, left border group, and right border group.

In some implementations of the present invention, the resulting groups of lines are filtered to remove duplicates (lines that are too similar to each other). Due to Hough transform's method of line identification, a single line generates a set of local maximums, such as (x,y), (x−1,y+2), (x−2,y+4), . . . . The lines resulting from these local maximums cross the top and bottom borders of the image at coordinates [xTop,xBottom], [xTop+1,xBottom+1], [xTop+1, xBottom−1], . . . respectively. Since these lines are very similar, they will all get similar confidence levels from the classifier.

In some implementations of the present invention, in order to determine whether two lines are too similar, the following heuristic test is applied: for each pair of lines, the system determines the distance between the points where these lines cross the opposite borders of the image. If these distances fall below a predetermined threshold, the lines are considered too similar and one of them is eliminated from the group of potential border lines.

Based on these potential border lines, the system may generate border rectangle hypotheses. For each generated hypothesis, a confidence level corresponding to confidence levels of lines forming the rectangle of this hypothesis may be calculated. In some implementations, the hypotheses are ranked based in their confidence levels.

The set of hypotheses may be filtered to eliminate sets of lines that may not form a suitable rectangle. In some implementations, the system also filters out the hypotheses having rectangles with unlikely geometry. The system may use the following parameters to identify unsuitable rectangles: angles at vertices, area of the resulting rectangle, side dimensions, and other geometric parameters. These parameters may be analyzed in order to identify unlikely hypotheses. In some implementations, the system evaluates such geometric parameters against predetermined threshold parameters.

At block 304, the system may further filter the set of the hypotheses based on geometric correlations and weights of the points located on the lines of the rectangles. In some implementations, the filtering is performed by a linear classifier. The system may further filter the remaining hypotheses to eliminate substantially similar hypotheses.

At block 305, the system may further evaluate remaining hypotheses using a neural network. In some implementations of the present invention the system may further evaluate corners of the rectangles using the neural network.

Figure 4:
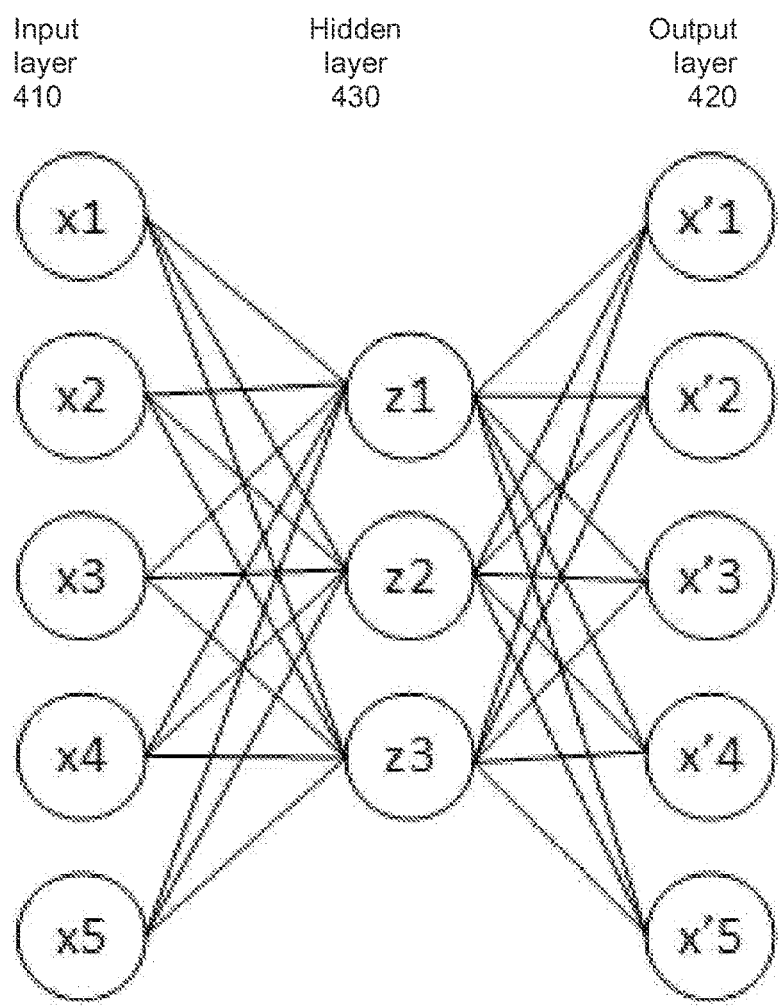
FIG. 4 is a schematic illustration of a structure of a neural network operating in accordance with one or more aspects of the present disclosure

FIG. 4 schematically illustrates a structure of a neural network operating in accordance with one or more aspects of the present disclosure. As shown in FIG. 4, the neural network 400 may be represented by a feed-forward, non-recurrent neural network including an input layer 410, an output layer 420 and one or more hidden layers 430 connecting the input layer 410 and the output layer 420. The output layer 420 may have the same number of nodes as the input layer 410, such that the network 400 may be trained, by an unsupervised learning process, to reconstruct its own inputs.

The neural network may include multiple neurons that are associated with learnable weights and biases. The neurons may be arranged in layers. The neural network may be trained on a training dataset of border hypotheses.

The neural network may generate an observed output for each training input. During training of the neural network, the parameters of the neural network may be adjusted to optimize the prediction accuracy. Training the neural network may involve processing, by the neural network, border hypotheses, such that the network would determine the quality metric (i.e., the observed output) for this hypothesis, and comparing the determined quality metric with the known quality metric (i.e., the target output corresponding to the training input as specified by the training data set). The observed output of the neural network may be compared with the target output, and the error may be propagated back to the previous layers of the neural network, whose parameters (e.g., the weights and biases of the neurons) may be adjusted accordingly in order to minimize the loss function (i.e., the difference between the observed output and the training output).

Once trained, the neural network may be used for automatic determination of quality metric for border hypotheses. In some implementations the neural network may be used for automatic determination of quality metrics for vertices of the rectangles. The mechanisms described herein to determine the quality metrics may improve the quality of image capture process by performing determination of the quality metric using a trained neural network in a way that considers most relevant attributes.

In some implementations, the quality metric of the hypothesis may be determined based on quality metrics of vertices of the rectangles. The quality metrics of vertices may be calculated by a neural network processing images of the vertices. Such images are usually relatively small and easy to handle, which reduces processing time for image capture in accordance with the present invention.

At block 306, the system may perform the second level classification of the rectangle hypotheses. In some implementations, a gradient-boosting classifier is used to perform the second level classification. The second level classification may use the same parameters as the first classification. In some implementations, the quality metrics for the vertices of the rectangles generated by the neural network may also be used as classification parameters for the second level classification.

As a result of second level classification, the best border hypothesis may be selected.

After the best border hypothesis is selected at block 306, returning to FIG. 2, at block 207 the system determines a quality metric of the selected frame. Only the portion of the selected frame that falls within the selected border is considered. In some implementations of the present invention, the system may apply noise-reducing methods to the image on the frame within the selected border to determine its quality metric.

At block 208, the system may compare the quality metric of the selected frame (as determined as block 207) with earlier-calculated quality metric of a previous frame. If quality metric of the selected frame is worse than quality metric of the previous frame, the selected frame is discarded, and a new frame is identified 204.

In some implementations of the present invention, the system identifies a specific frame in the video stream with predetermined frequency. In some implementations of the present invention, the system identifies a specific frame in the video stream at predetermined time intervals. In some implementation of the present invention, the next frame is identified when analysis of the previous identified frame is completed. In some implementations, the system analyses a predetermined number of specific frames and moves to the next step if a better frame is not identified between a predetermined number of frames or within a predetermined period of time.

At block 209, the system evaluates the frame's suitability for optical character recognition (OCR). In some implementations the OCR suitability evaluation is performed locally on the mobile device. Alternatively, the OCR suitability evaluation may be performed on the server after the selected frame has been captured and transferred to the server.

At block 210, the system performs post-processing of the selected frame. The post-processing may include optical character recognition of the image on the selected frame, machine translation of a text on the selected frame, or other document processing or image processing operations.

Figure 5:
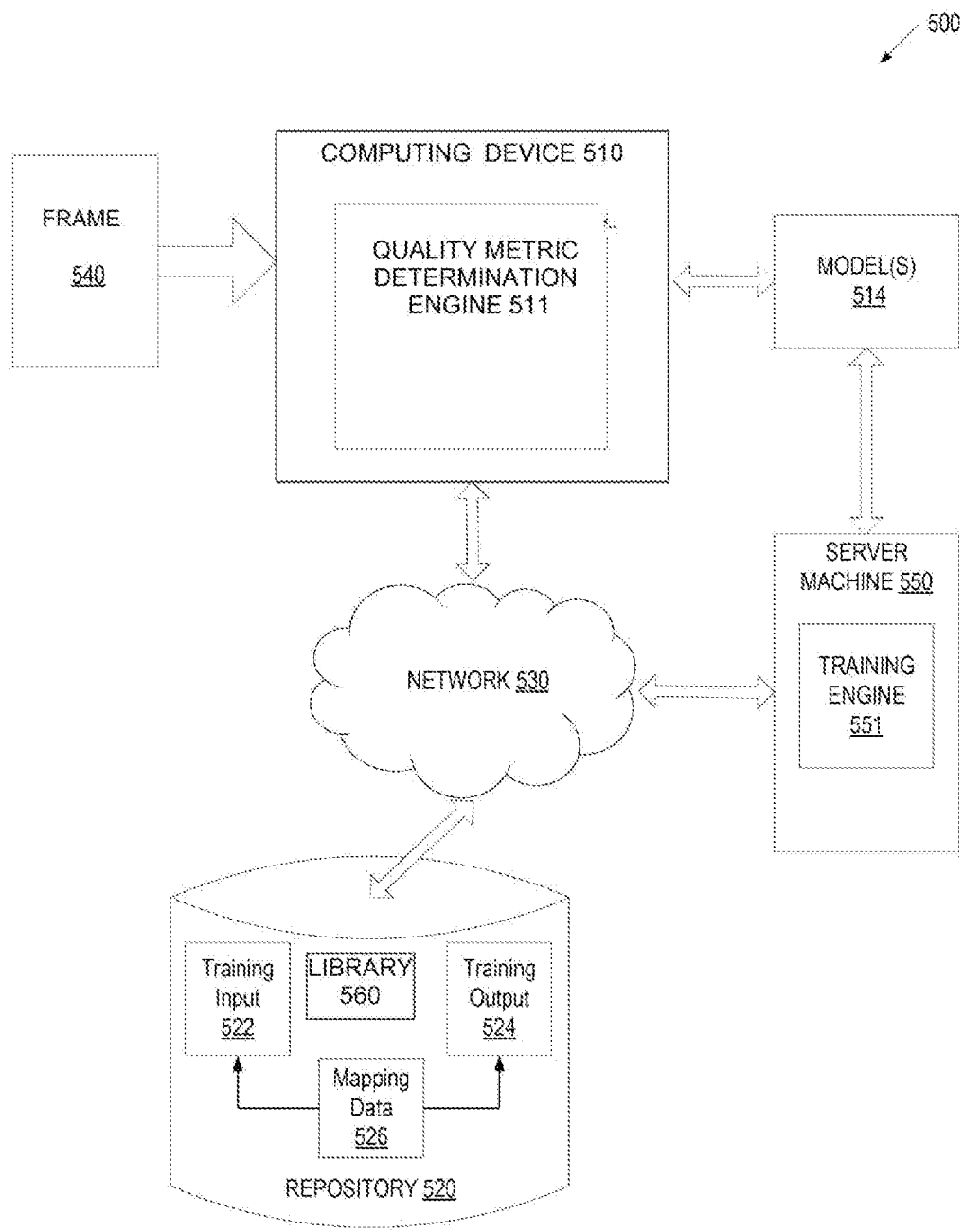
FIG. 5 is a block diagram of an example computer system in which implementations of the disclosure may operate.

FIG. 5 is a block diagram of an example computer system 500 in which implementations of the disclosure may operate. As illustrated, system 500 can include a computing device 510, a repository 520, and a server machine 550 connected to a network 530. Network 530 may be a public network (e.g., the Internet), a private network (e.g., a local area network (LAN) or wide area network (WAN)), or a combination thereof.

The computing device 510 may be a desktop computer, a laptop computer, a smartphone, a tablet computer, a server, a scanner, or any suitable computing device capable of performing the techniques described herein. In some implementations, the computing device 510 can be (and/or include) one or more computing devices 600 of FIG. 6.

A frame 540 may be received by the computing device 510. The frame 540 may be received in any suitable manner. Additionally, in instances where the computing device 510 is a server, a client device connected to the server via the network 530 may upload a frame 540 to the server. In instances where the computing device 510 is a client device connected to a server via the network 530, the client device may download the frame 540 from the server or from the repository 520.

The frame 540 may be used to train a set of machine learning models or may be a new frame for which quality metric determination is desired.

In one implementation, computing device 510 may include a quality metric determination engine 511. The quality metric determination engine 511 may include instructions stored on one or more tangible, machine-readable storage media of the computing device 510 and executable by one or more processing devices of the computing device 510.

In one implementation, the quality metric determination engine 511 may use a set of trained machine learning models 314 to determine one or more quality metrics of the frame 540. The library of frames may be stored in a repository 520. The machine learning models 514 are trained and used to determine quality metrics.

The quality metrics determination engine 511 may be a client-based application or may be a combination of a client component and a server component. In some implementations, the quality metrics determination engine 511 may execute entirely on the client computing device such as a server computer, a desktop computer, a tablet computer, a smart phone, a notebook computer, a camera, a video camera, or the like. Alternatively, a client component of quality metrics determination engine 511 executing on a client computing device may receive a frame and transmit it to a server component of the quality metrics determination engine 511 executing on a server device that performs the determination of quality metrics. The server component of the quality metrics determination engine 511 may then return a determined quality metrics to the client component of the quality metrics determination engine 511 executing on the client computing device for storage. Alternatively, the server component of the quality metrics determination engine 511 may provide an identification result to another application. In other implementations, quality metrics determination engine 511 may execute on a server device as an Internet-enabled application accessible via a browser interface. The server device may be represented by one or more computer systems such as one or more server machines, workstations, mainframe machines, personal computers (PCs), etc.

Server machine 550 may be and/or include a rackmount server, a router computer, a personal computer, a portable digital assistant, a mobile phone, a laptop computer, a tablet computer, a camera, a video camera, a netbook, a desktop computer, a media center, or any combination of the above. The server machine 550 may include a training engine 551. The training engine 551 can construct the machine learning model(s) 514 for quality metrics determination. The machine learning model(s) 514, as illustrated in FIG. 5, may be trained by the training engine 551 using training data that includes training inputs and corresponding training outputs (correct answers for respective training inputs). The training engine 551 may find patterns in the training data that map the training input to the training output (the answer to be predicted) and provide the machine learning models 514 that capture these patterns. The set of machine learning models 514 may be composed of, e.g., a single level of linear or non-linear operations (e.g., a support vector machine (SVM)) or may be a deep neural network, e.g., a machine learning model that is composed of multiple levels of non-linear operations. Examples of deep neural networks are neural networks including convolutional neural networks, recurrent neural networks (RNN) with one or more hidden layers, and fully connected neural networks.

The machine learning models 514 may be trained to determine quality metrics for the frame 340. The training data may be stored in the repository 520 and may include one or more training inputs 522 and one or more training outputs 524. The training data may also include mapping data 526 that maps the training inputs 522 to the training outputs 524. During the training, the training engine 551 can find patterns in the training data 526 that can be used to map the training inputs to the training outputs. The patterns can be subsequently used by the machine learning model(s) 514 for future predictions. For example, upon receiving an input of unknown frame, the trained machine learning model(s) 514 may predict a quality metrics for this frame and may provide such quality metrics as an output.

The repository 520 may be a persistent storage capable of storing structures to perform similarity measure determination in accordance with implementations of the present disclosure. The repository 520 may be hosted by one or more storage devices, such as main memory, magnetic or optical storage-based disks, tapes or hard drives, NAS, SAN, and so forth. Although depicted as separate from the computing device 510, in an implementation, the repository 520 may be part of the computing device 510. In some implementations, repository 520 may be a network-attached file server, while in other implementations content repository 520 may be some other type of persistent storage such as an object-oriented database, a relational database, and so forth, that may be hosted by a server machine or one or more different machines coupled to the via the network 530.

Figure 6:
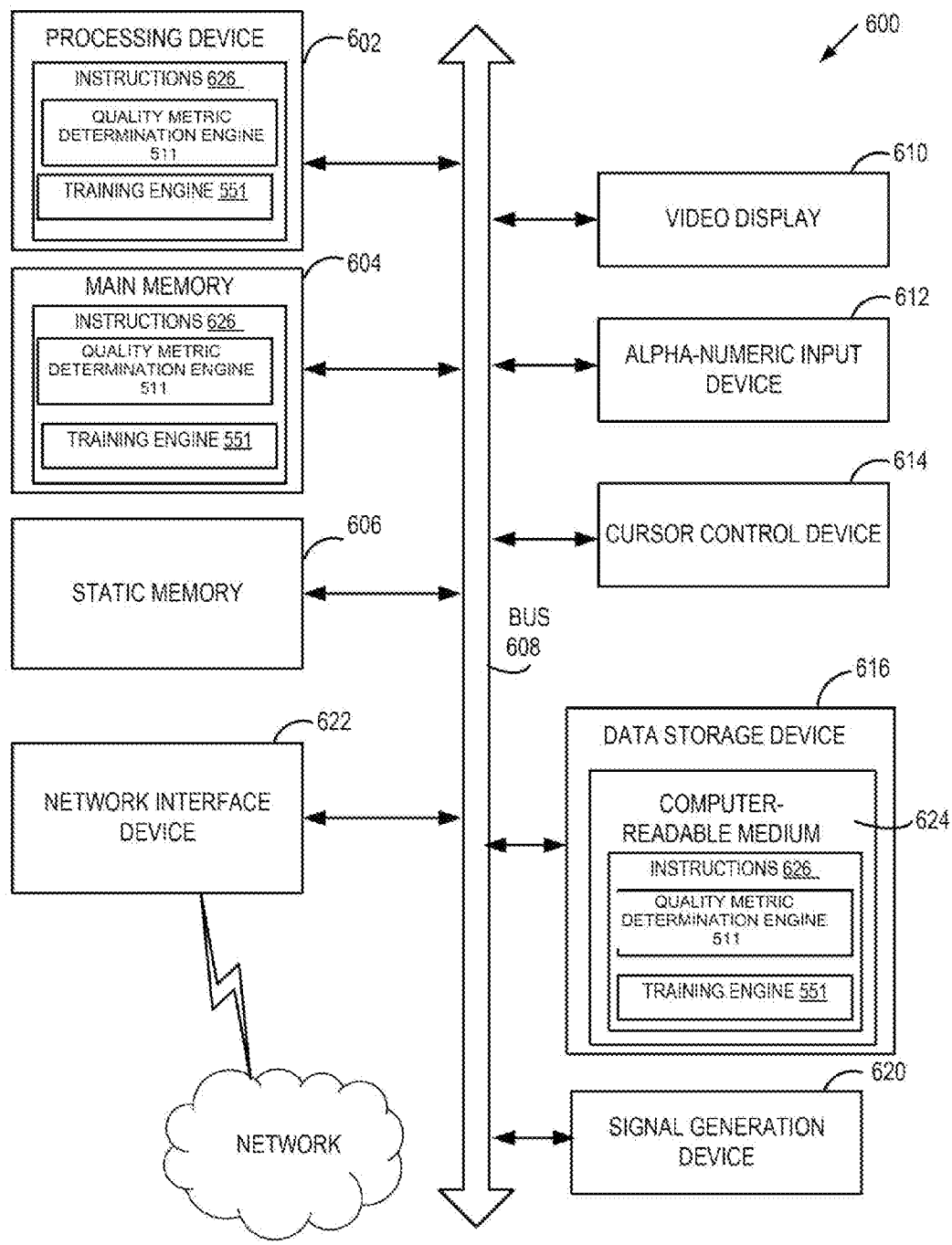
FIG. 6 illustrates a block diagram of a computer system in accordance with some implementations of the present disclosure.

FIG. 6 depicts an example computer system 600 which can perform any one or more of the methods described herein. The computer system may be connected (e.g., networked) to other computer systems in a LAN, an intranet, an extranet, or the Internet. The computer system may operate in the capacity of a server in a client-server network environment. The computer system may be a personal computer (PC), a tablet computer, a set-top box (STB), a Personal Digital Assistant (PDA), a mobile phone, a camera, a video camera, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The exemplary computer system 600 includes a processing device 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)), and a data storage device 616, which communicate with each other via a bus 608.

Processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 602 may also be one or more special-purpose processing devices such as an application specific integrated circuit (ASIC), a field programmable gate array (FPGA), a digital signal processor (DSP), network processor, or the like. The processing device 602 is configured to execute instructions 626 for implementing the quality metrics detection engine 511 and/or the training engine 551 of FIG. 5 and to perform the operations and steps discussed herein (e.g., method 200 of FIG. 2).

The computer system 600 may further include a network interface device 622. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker). In one illustrative example, the video display unit 610, the alphanumeric input device 612, and the cursor control device 614 may be combined into a single component or device (e.g., an LCD touch screen).

The data storage device 616 may include a computer-readable storage medium 624 on which is stored the instructions 626 embodying any one or more of the methodologies or functions described herein. The instructions 626 may also reside, completely or at least partially, within the main memory 604 and/or within the processing device 602 during execution thereof by the computer system 600, the main memory 604 and the processing device 602 also constituting computer-readable media. In some implementations, the instructions 626 may further be transmitted or received over a network via the network interface device 622.

While the computer-readable storage medium 624 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that the aspects of the present disclosure may be practiced without these specific details. In some instances, well-known structures and devices are shown in block diagram form, rather than in detail, in order to avoid obscuring the present disclosure.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "determining," "selecting," "storing," "analyzing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description. In addition, aspects of the present disclosure are not described with reference to any particular programming language. It will be appreciated that a variety of programming languages may be used to implement the teachings of the present disclosure as described herein.

Aspects of the present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read-only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. Furthermore, the terms "first," "second," "third," "fourth," etc. as used herein are meant as labels to distinguish among different elements and may not necessarily have an ordinal meaning according to their numerical designation.

Whereas many alterations and modifications of the disclosure will no doubt become apparent to a person of ordinary skill in the art after having read the foregoing description, it is to be understood that any particular implementation shown and described by way of illustration is in no way intended to be considered limiting. Therefore, references to details of various implementations are not intended to limit the scope of the claims, which in themselves recite only those features regarded as the disclosure.

What is claimed is:

1. A computer-implemented method for image capture by a mobile device, comprising:
   receiving, by a video capturing application running on a mobile device, a video stream from a camera of the mobile device;
   identifying a specific frame of the video stream;
   generating a plurality of hypotheses defining image borders within the specific frame;
   selecting, by a neural network, a particular hypothesis among the plurality of hypotheses;
   producing a candidate image by applying the particular hypothesis to the specific frame;
   determining a value of a quality metric of the candidate image;
   determining that the value of the quality metric of the candidate image exceeds one or more values of the quality metric of one or more previously processed images extracted from the video stream;
   wherein the video capturing application is a zero-footprint application.

2. The method of claim 1, further comprising performing optical character recognition of a document depicted by the candidate image.

3. The method of claim 2, wherein the optical character recognition of the document is performed on the mobile device.

4. The method of claim 1, further comprising cropping the candidate image.

5. The method of claim 1, further comprising: displaying the candidate image on a screen of the mobile device.

6. The method of claim 1, wherein receiving the video stream is performed responsive to receiving a command via a web browser control.

7. The method of claim 1, wherein receiving the video stream is performed responsive to receiving a command via a user interface control of the mobile device.

8. A system, comprising:
   a memory;
   a processor, coupled to the memory, the processor configured to:
      receive, by a video capturing application running on a mobile device, a video stream from a camera of the mobile device;
      identify a specific frame of the video stream;
      generate a plurality of hypotheses defining image borders within the specific frame;
      select, by a neural network, a particular hypothesis among the plurality of hypotheses;
      produce a candidate image by applying the particular hypothesis to the specific frame;
      determine a value of a quality metric of the candidate image;
      determine that the value of the quality metric of the candidate image exceeds one or more values of the quality metric of one or more previously processed images extracted from the video stream;
      wherein the video capturing application is a zero-footprint application.

9. The system of claim 8, wherein the processor is further configured to: perform optical character recognition of a document depicted by the candidate image.

10. The system of claim 9, wherein the optical character recognition of the document is performed on the mobile device.

11. The system of claim 8, wherein the processor is further configured to: crop the candidate image.

12. The system of claim 8, wherein the processor is further configured to: display the candidate image on a screen of the mobile device.

13. The system of claim 8, wherein receiving the video stream is performed responsive to receiving a command via a web browser control.

14. The system of claim 8, wherein receiving the video stream is performed responsive to receiving a command via a user interface control of the mobile device.

15. A non-transitory computer-readable storage medium comprising executable instructions that, when executed by a computer system, cause the computer system to:
   receive, by a video capturing application running on a mobile device, a video stream from a camera of the mobile device;
   identify a specific frame of the video stream;
   generate a plurality of hypotheses defining image borders within the specific frame;
   select, by a neural network, a particular hypothesis among the plurality of hypotheses;

produce a candidate image by applying the particular hypothesis to the specific frame;

determine a value of a quality metric of the candidate image;

determine that the value of the quality metric of the candidate image exceeds one or more values of the quality metric of one or more previously processed images extracted from the video stream;

wherein the video capturing application is a zero-footprint application.

16. The non-transitory computer-readable storage medium of claim 15, wherein the executable instructions further cause the computer system to: perform optical character recognition of a document depicted by the candidate image.

17. The non-transitory computer-readable storage medium of claim 16, wherein the optical character recognition of the document is performed on the mobile device.

18. The non-transitory computer-readable storage medium of claim 15, wherein the executable instructions further cause the computer system to: crop the candidate image.

19. The non-transitory computer-readable storage medium of claim 15, wherein the executable instructions further cause the computer system to: display the candidate image on a screen of the mobile device.

20. The non-transitory computer-readable storage medium of claim 15, wherein receiving the video stream is performed responsive to receiving a command via a web browser control.

* * * * *